United States Patent [19]

Amano

[11] Patent Number: 4,697,271
[45] Date of Patent: Sep. 29, 1987

[54] SOLID-STATE LASER DEVICE CAPABLE OF EFFECTIVELY EXCITING A PLURALITY OF SLAB-SHAPED LASER MEDIA

[75] Inventor: Satoru Amano, Tokyo, Japan
[73] Assignee: Hoya Corporation, Tokyo, Japan
[21] Appl. No.: 782,065
[22] Filed: Sep. 30, 1985
[30] Foreign Application Priority Data Sep. 29, 1984 [JP] Japan .............................. 59-203002

[51] Int. Cl.⁴ .............................................. H01S 3/14
[52] U.S. Cl. ......................................... 372/68; 372/69
[58] Field of Search ..................... 372/71, 72, 68, 66, 372/34

[56] References Cited

U.S. PATENT DOCUMENTS

| | | | |
|---|---|---|---|
| 3,665,335 | 5/1972 | Tomiyasu | 372/66 |
| 4,096,450 | 6/1978 | Hill et al. | 372/34 |
| 4,214,216 | 7/1980 | Jones, Jr. | 372/71 |
| 4,233,567 | 11/1980 | Chernoch | 372/72 |
| 4,528,671 | 7/1985 | Robbins | 378/71 |
| 4,555,786 | 11/1985 | Byer | 372/71 |

Primary Examiner—Leon Scott, Jr.
Attorney, Agent, or Firm—Frishauf, Holtz, Goodman & Woodward

[57] ABSTRACT

A plurality of slab-shaped laser media are surrounded by an internal reflection surface of a reflector member and kept substantially parallel to each other by a supporting member. Internal gaps are left between two adjacent ones of the media and additional gaps are left between two endmost ones of the media and the internal reflection surface. A plurality of lamp members are located within the internal and additional gaps so that each lamp member effectively excites two adjacent media in the internal gaps, and a single medium in cooperation with the internal reflection surface in each additional gap. Each medium produces a laser beam along a traveling direction as a result of excitation. Each lamp member may be a single or a plurality of elongated flash lamps parallel to or transverse to the traveling direction. Alternatively, each lamp member may be a flat excitation lamp having flat surfaces juxtaposed to each medium.

7 Claims, 11 Drawing Figures

SOLID-STATE LASER DEVICE CAPABLE OF EFFECTIVELY EXCITING A PLURALITY OF SLAB-SHAPED LASER MEDIA

BACKGROUND OF THE INVENTION

This invention relates to a solid-state laser device for use in oscillating or amplifying a laser beam by the use of an active laser medium of a slab type, thereafter referred to as a slab-shaped laser medium.

A conventional solid-state laser device of the type described is proposed by Jones, Jr. in U.S. Pat. No. 4,214,216. The proposed device comprises a slab-shaped laser medium having a pair of end surfaces and a pair of principal surfaces contiguous to the end surfaces. The slab-shaped laser medium is interposed between a pair of excitation lamps, namely, flash lamps with spacings left between the principal surfaces and the excitation lamps, respectively. A cooling medium, such as gas, liquid, or the like is caused to flow through the spacings so as to cool the slab-shaped laser medium.

In the above-mentioned laser device, a laser beam travels in a traveling direction from one end surface of the slab-shaped laser medium to the other, by causing total internal reflections to occur on each of the principal surfaces. Thus, the laser beam travels along a zigzag light path which intermittently intersects a center portion of the slab-shaped laser medium. The center portion may attain a high temperature in comparison with the principal surfaces cooled by the cooling medium. As a result, a thermal gradient inevitably occurs in the slab-shaped laser medium.

As mentioned before, the zigzag light path alternatingly passes through a low temperature portion, such as an adjacent portion of each principal surface, and through a high temperature portion, such as the center portion. This serves to make the temperature distribution uniform in the slab-shaped laser medium. Accordingly, the slab-shaped laser medium can produce an output laser beam of high output energy as compared with a laser medium of a rod type.

Recent trends require high optical energy of the output laser beam, as such a laser device pervades a wide variety of technical fields. However, the slab-shaped laser medium has a low conversion efficiency between electric energy used to excite the slab-shaped laser medium and the optical energy of the output laser beam. Thus, a laser device having a high optical output energy becomes large in size.

Under the circumstances, a great deal of input electric energy must be supplied to the solid-state laser device in order to attain an output laser beam of high optical energy.

SUMMARY OF THE INVENTION

It is an object of this invention to provide a solid-state laser device which has a high conversion efficiency between electric energy and optical energy.

It is another object of this invention to provide a solid-state laser device of the type described, which is compact in size.

According to this invention, a solid-state laser device comprises a plurality of slab-shaped laser media each of which has a pair of principal surfaces parallel to each other and a pair of end surfaces opposite to each other and contiguous to the principal surfaces, a reflector member having an internal reflection surface which surrounds the plurality of the slab-shaped laser media and which comprises a pair of internal partial surfaces opposite to each other and directed towards the principal surfaces, and supporting means for supporting the plurality of the slab-shaped laser media with two endmost ones of the slab-shaped laser media confronted with the partial surfaces, respectively. The slab-shaped laser media are kept substantially parallel to each other with each internal gap left between two adjacent ones of the slab-shaped laser media and with each additional gap left between each endmost one of the slab-shaped laser media and each of said internal partial surfaces. The device further comprises exciting means laid in each of the internal and the additional gaps for optically exciting the slab-shaped laser media.

DESCRIPTION OF THE PREFERRED EMBODIMENTS

In FIGS. 1 through 4, a solid-state laser device according to a first embodiment of this invention operates as an oscillation device and comprises a reflector member 21 of, for example, stainless steel, aluminum, brass, or the like. The reflector member 21 has an internal surface on which a plated layer of gold is deposited to provide an internal reflection surface. The illustrated internal reflection surface defines a rectangular prismal space or a rectangular cavity having a cavity axis, and has a pair of internal partial surfaces opposite to each other and directed upwards and downwards of FIGS. 1 and 2 and a pair of internal side surfaces confronting each other and contiguous to the internal partial surfaces. The cavity axis extends between the lefthand side of FIGS. 1 and 2 and the righthand side thereof.

Figure 1:
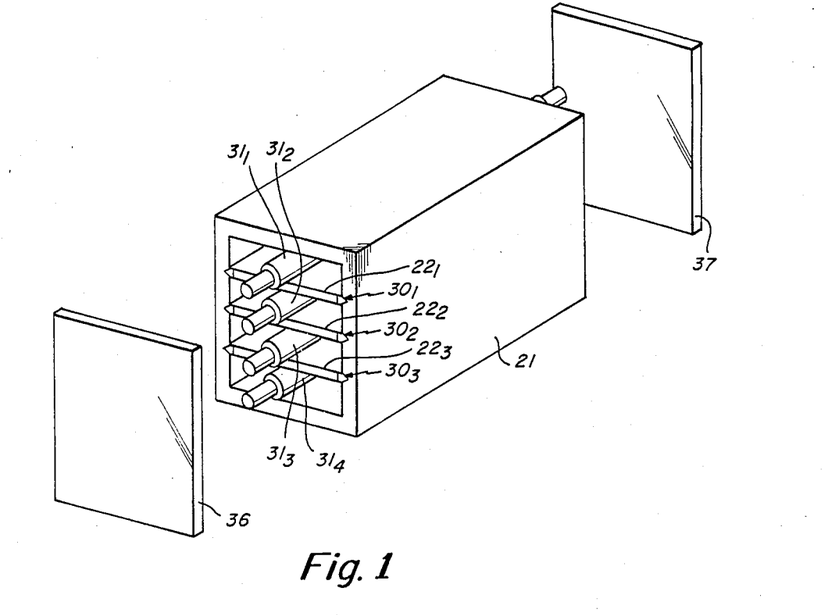
FIG. 1 is a schematic perspective view of a solid-state laser device according to a first embodiment of this invention.
Figure 2:
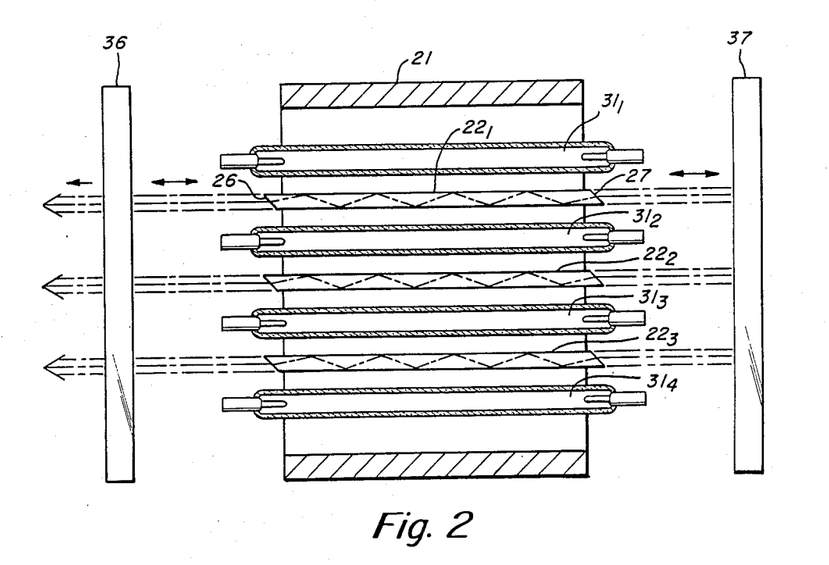
FIG. 2 is a longitudinal sectional view of the solid-state laser device illustrated in FIG. 1.
Figure 3:
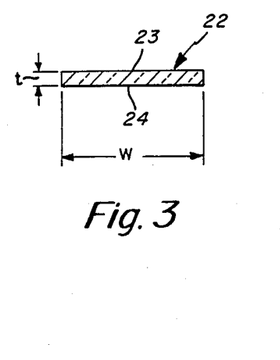
FIG. 3 is a cross sectional view of a slab-shaped laser medium for use in the device illustrated in FIGS. 1 and 2.
Figure 4:
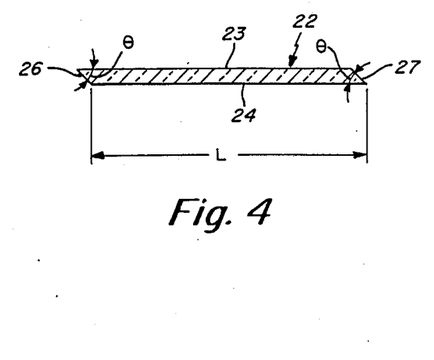
FIG. 4 is a longitudinal sectional view of the slab-shaped laser medium illustrated in FIG. 3.

First through third slab-shaped laser media $22_1$, $22_2$, and $22_3$ are disposed in the rectangular cavity and consecutively numbered from the uppermost one of the laser media illustrated in FIGS. 1 and 2. The first and the third slab-shaped laser media $22_1$ and $22_3$ will be called endmost laser media. Each slab-shaped laser medium 22 (suffixes omitted) is of a rectangle in cross section, as shown in FIG. 3, and is of a parallelogram in longitudinal section, as shown in FIG. 4. The illustrated laser medium 22 may be made of phosphate laser glass, for example, LHG-8 manufactured and sold by HOYA Corporation, Tokyo, and has a width W, a length L, and a thickness t which may be, for example, 25 mm, 120 mm, and 4 mm, respectively.

In addition, the laser medium 22 has first and second principal surfaces 23 and 24 which are parallel to each other and directed upwards and downwards of FIGS. 3 and 4, respectively. As illustrated in FIG. 4, the laser medium 22 further has first and second end surfaces 26 and 27 inclined to each of the first and second principal surfaces at an angle $\theta$ of 45°. The illustrated end surfaces 26 and 27 are parallel to each other and have optical flatness in order to reduce loss. The laser medium 22 allows a laser beam to travel along a traveling direction from one of the end surfaces 26 and 27 to the other. During traveling of the laser beam, total internal reflections repeatedly occur on the principal surfaces 23 and 24 and are repeated eight times in the illustrated laser medium 22, as illustrated in FIG. 2.

In FIGS. 1 and 2, the first through third slab-shaped laser media $22_1$ to $22_3$ are supported on the internal side surfaces of the internal reflection surface by the use of three support members $30_1$, $30_2$, and $30_3$ each of which consists of a pair of supports mounted on the respective internal side surfaces. Each support may be of quartz glass. The first through third slab-shaped laser media $22_1$ to $22_3$ are kept by the respective support members $30_1$ to $30_3$ substantially parallel to one another. The first and the second end surfaces 26 and 27 are directed to the lefthand side and the righthand sides of FIGS. 1 and 2, respectively. As a result, the cavity is partitioned by the laser media $22_1$ to $22_3$ into four gaps extended along the cavity axis.

Two of the gaps are left between the first and the second slab-shaped laser media $22_1$ and $22_2$ and between the second and the third slab-shaped laser media $22_2$ and $22_3$, and will be called internal gaps hereinafter. Thus, the internal gaps are those left between two adjacent ones of the laser media.

Two additional gaps remain between the first slab-shaped laser medium $22_1$ and the upper one of the internal partial surfaces and between the third slab-shaped laser medium $22_3$ and the lower one of the internal partial surfaces, and will be referred to as additional gaps. Thus, the additional gaps are those left between the endmost laser media and the internal partial surfaces, respectively.

The laser media $22_1$ to $22_3$ may be detachable from the support members $30_1$ to $30_3$, respectively.

In the internal and the additional gaps, first through fourth excitation members are laid substantially parallel to the internal partial surfaces of the reflector member 21 and the principal surfaces of each slab-shaped laser medium $22_1$ to $22_3$. The first through fourth excitation members will be collectively called an exciting unit. In the example being illustrated, the first through fourth excitation members are implemented by first through fourth elongated flash lamps $31_1$ to $31_4$, respectively. Thus, each excitation member is composed of a single elongated flash lamp. The first through fourth elongated flash lamps $31_1$ to $31_4$ have longitudinal lamp axes extended along the traveling direction of each laser beam, and are out of contact with any slab-shaped laser media. This means that spacings are left between the respective elongated flash lamps $31_1$ to $31_4$ and adjacent one or ones of the principal surfaces, and that a cooling medium, such as a gas or a liquid, flows through the spacings so as to cool the slab-shaped laser media $22_1$ to $22_3$. Each spacing may be equal, for example, to 10 mm.

Each elongated flash lamp 30 may be, for example, a xenon lamp comprising a cylindrical vacuum tube having an inside diameter of 15 mm, a wall thickness of 1 mm, and a length of 150 mm.

First and second mirrors 36 and 37 are disposed on both ends of the first through third slab-shaped laser media $22_1$ to $22_3$, and are confronted with the first end surfaces 26 and the second end surfaces 27, respectively. The first mirror 36 has a reflectance of 60% and may be a half mirror while the second mirror 37 has a reflectance of 99% and is therefore a total reflection mirror. At any rate, the first and second mirrors 36 and 37 operate as an optical resonator for laser oscillation.

When the first through fourth flash lamps $31_1$ to $31_4$ are fired by supply of electric energy to produce excitation light, the first through third slab-shaped laser media $22_1$ to $22_3$ are excited or pumped by the excitation light. In this event, the excitation light produced from the first flash lamp $31_1$ is thrown directly on the upper principal surface of the first slab-shaped laser medium $22_1$ and indirectly thereon through the internal reflection surface. Likewise, the excitation light from the fourth flash lamp $31_4$ is directly and indirectly thrown on the lower principal surface of the third slab-shaped laser medium $22_3$.

Furthermore, the excitation light from each of the second and third flash lamps $31_2$ and $31_3$ is directed upwards and downwards to two principal surfaces of adjacent slab-shaped laser media that confront each other. From this fact, it is readily understood that two adjacent ones of the slab-shaped laser media are activated by a single one of the flash lamps $31_1$ to $31_4$.

Accordingly, the excitation light is effectively supplied from the flash lamps to adjacent one or ones of the slab-shaped laser media $31_1$ to $31_4$. Consequently, it is possible to raise the utilization factor or availability of the excitation light produced from each laser medium.

When the slab-shaped laser media $22_1$ to $22_3$ are excited in the above-mentioned manner, the laser beams are oscillated from the first through third slab-shaped laser media $22_1$ to $22_3$ in cooperation with the optical resonator and are produced through the first mirror 36. The laser beams are focused by the use of a cylindrical lens (not shown) into a single output laser beam having optical energy.

Figure 5:
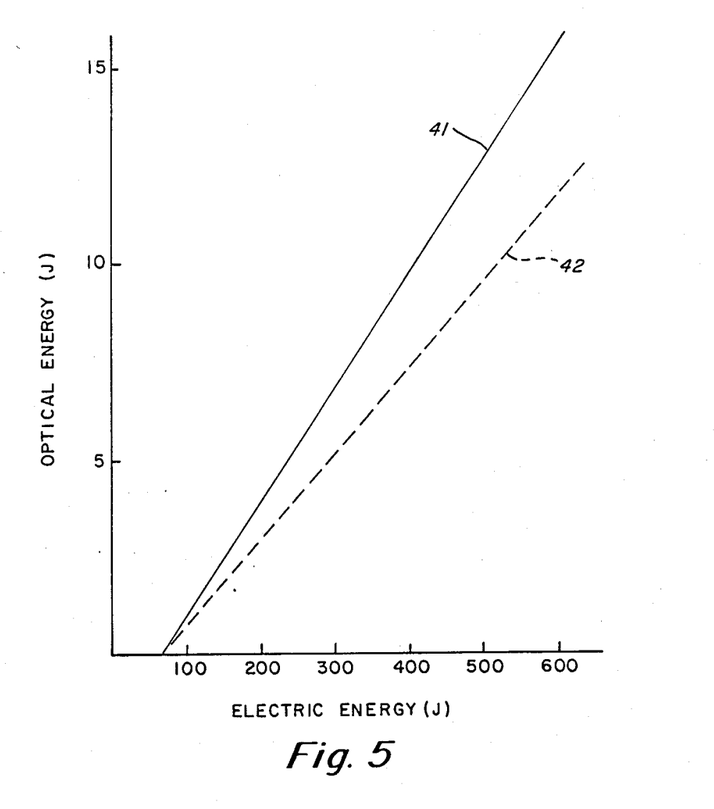
FIG. 5 shows a graphical representation of relationships between input electric energy and output optical energy to compare a conventional laser device with the laser device illustrated in FIGS. 1 and 2.

Referring to FIG. 5, a first curve 41 shows a characteristic of the solid-state laser device illustrated in FIGS. 1 and 2. The characteristic is specified by a relationship between total electric energy (J) supplied to the respective flash lamps 31 and the optical energy of the single output laser beam. When the total electric energy is equal to 600J, the illustrated laser device produces the output laser beam of 16J. Conversion efficiency of electric energy to optical energy becomes about 2.7%.

A second curve 42 shows a similar relationship of a conventional laser device wherein a single slab-shaped laser medium is interposed between two flash lamps. In such a conventional laser device, supply of electric energy of 600J results in an output laser beam having optical energy of 12J. The resultant conversion efficiency is equal to 2%.

Thus, the solid-state laser device illustrated in FIGS. 1 and 2 has an improved conversion efficiency.

Figure 6:
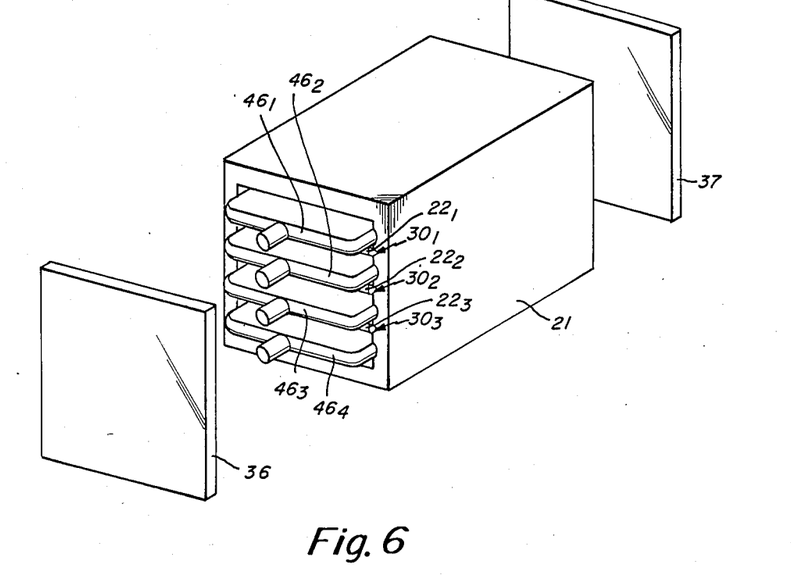
FIG. 6 is a schematic perspective view of a solid-state laser device according to a second embodiment of this invention.
Figure 7:
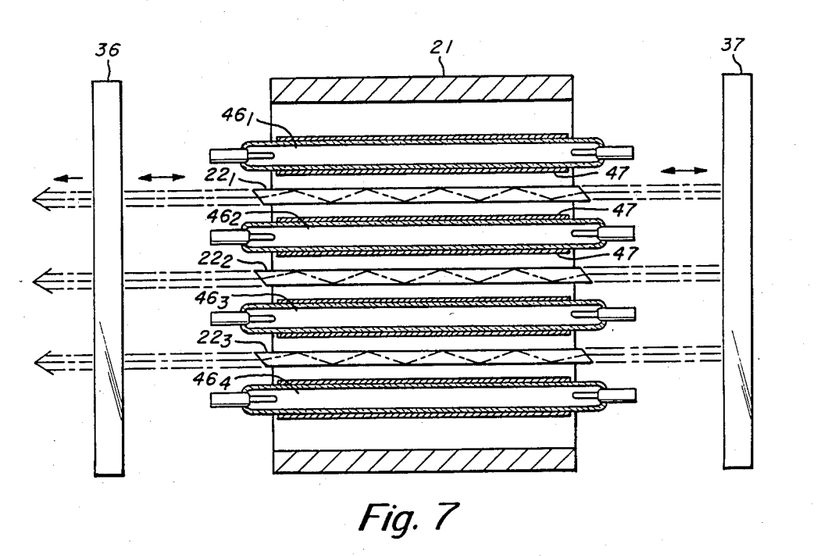
FIG. 7 is a longitudinal sectional view of the solid-state laser device illustrated in FIG. 6.

Referring to FIGS. 6 and 7, a solid-state laser device according to a second embodiment of this invention is similar to that illustrated in FIGS. 1 and 2 except that first through fourth flat excitation lamps $46_1$ to $46_4$ are substituted as the first through fourth excitation members for the elongated flash lamps 31 illustrated in FIGS. 1 and 2. Each of the first through fourth flat excitation lamps $46_1$ to $46_4$ has an envelope having a pair of flat surfaces opposite to each other, a pair of side surfaces confronted with each other and contiguous to the flat surfaces, and a pair of ends through which electrodes are inserted into an inside space of the envelope.

Such a flat excitation lamp emits excitation light when discharge takes place between the electrodes. The discharge might be uneven or nonuniform along a longitudinal axis of the flat excitation lamp which is substantially parallel to the traveling direction. In order to make uniform discharge take place between the electrodes, it is preferable that at least one of the flat surfaces of each flat excitation lamp be coated with an electrically conductive layer 47 of, for example, indium tin oxide. The conductive layer 47 may be transparent to at least a part of the excitation light which is absorbed by each laser medium 22. As regards the second and third flat excitation lamps $46_2$ and $46_3$, the conductive layer 47 is attached to both of the flat surfaces of each lamp.

On the other hand, the conductive layer 47 is deposited only on the lower one of the flat surfaces of the first flat excitation lamp $46_1$, and on the upper one of the flat surfaces of the fourth flat excitation lamp $46_4$. The upper flat surface of the first flat excitation lamp $46_1$ and the lower flat surface of the fourth excitation lamp $46_4$ may be covered with an opaque layer of metal, such as gold. With this structure, the first and fourth flat excitation lamps $46_1$ and $46_4$ operate as a reflector.

Each flat excitation lamp 46 may be, for example, a xenon lamp which is 55 mm wide, 5 mm thick, and 150 mm long. The envelope of the xenon lamp has a wall thickness of, for example, about 1 mm and may be of quartz.

The flat excitation lamps $46_1$ to $46_4$ are disposed in the internal and the additional gaps so that the flat surfaces of each flat excitation lamp 46 are kept substantially parallel to each principal surface of the slab-shaped laser media 22, with spacings left between the flat surfaces and the principal surfaces. The spacings serve to allow a cooling medium to flow therethrough, as mentioned in conjunction with FIGS. 1 and 2.

The excitation light emitted from each flat excitation lamp 46 has a uniform distribution in intensity along the width direction transverse to the traveling direction. Accordingly, the thermal distribution becomes substantially uniform along the width direction in each slab-shaped laser medium. This results in a reduction of thermal distortion which otherwise appears in the slab-shaped laser media 22.

When a slab-shaped laser medium is excited by an elongated flash lamp as shown in FIG. 1, it is generally said that the width of the laser medium must be smaller than two times an inside diameter of the elongated flash lamp.

Under the circumstances, the flat excitation lamps 46 make it possible to use a wide laser medium which produces a laser beam of a high power. Accordingly, the laser device illustrated in FIGS. 6 and 7 can oscillate an output laser beam of high optical energy in a large beam size.

Figure 8:
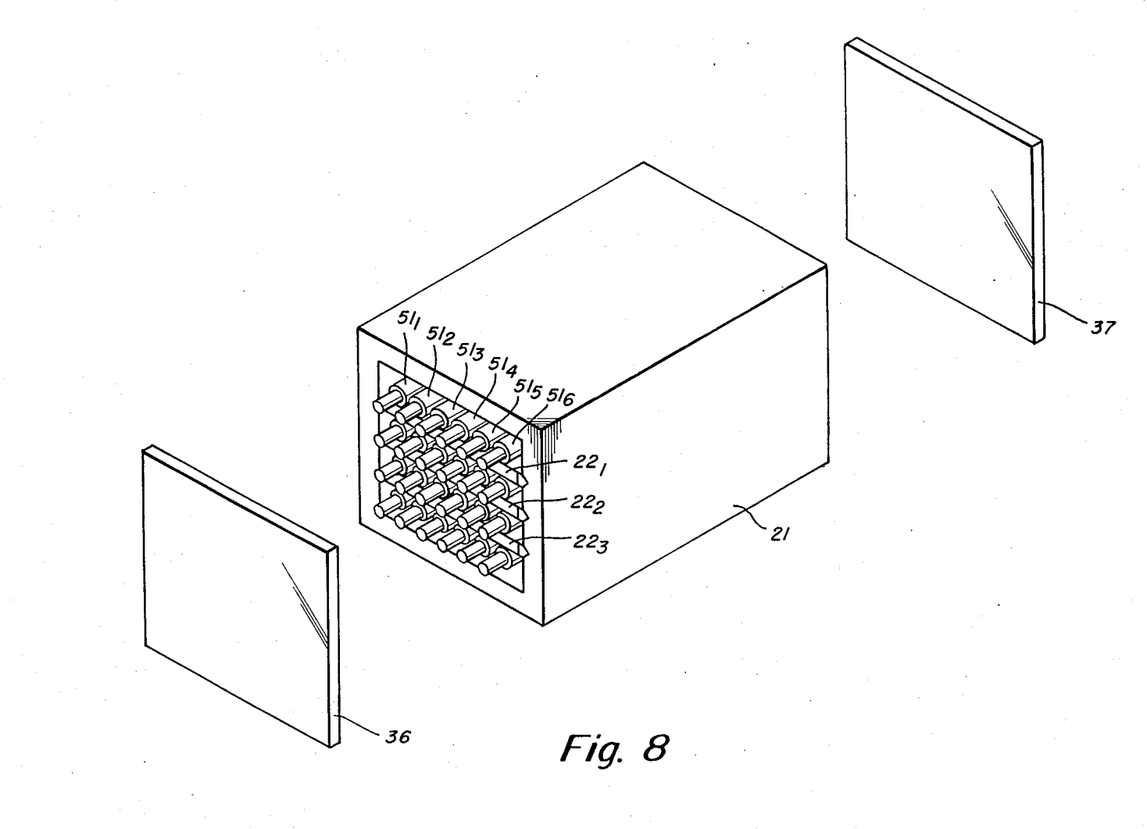
FIG. 8 is a schematic perspective view of a solid-state laser device according to a third embodiment of this invention.

Referring to FIG. 8, a solid-state laser device according to a third embodiment of this invention is similar to that illustrated in FIG. 1 except that each of the first through fourth excitation members comprises six elongated flash lamps $51_1$ to $51_6$ which are extended along the traveling direction of each laser beam traveling in each slab-shaped laser medium $22_1$ to $22_4$, and which are disposed parallel to one another in the width direction transverse to the traveling direction. The elongated flash lamps $51_1$ to $51_6$ of each excitation member are laid over each principal surface with a spacing left between the elongated flash lamps $51_1$ to $51_6$ and each principal surface, as mentioned before.

Such a parallel disposition of the elongated flash lamps $51_1$ to $51_6$ is helpful to make a distribution of the excitation light uniform along the width direction, like in FIGS. 6 and 7.

Figure 9:
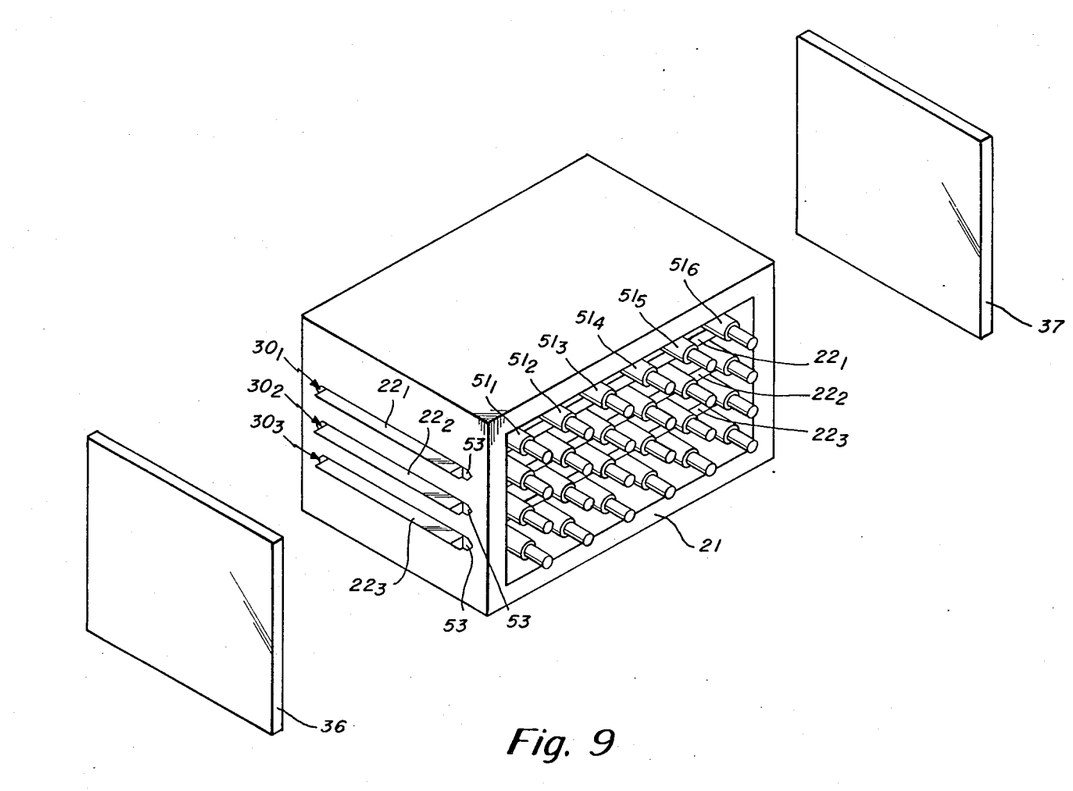
FIG. 9 is a schematic perspective view of a solid-state laser device according to a fourth embodiment of this invention.

Referring to FIG. 9, a solid-state laser device according to a fourth embodiment of this invention is similar to that illustrated in FIG. 8 except that each of the first through fourth excitation members comprises six elongated flash lamps $51_1$ to $51_6$ arranged in a manner different from those illustrated in FIG. 8. More specifically, each of the first through third slab-shaped laser media $22_1$, $22_2$, and $22_3$ is laid along a traveling direction of a laser beam activated therein and therefore has the first and second end surfaces 26 and 27 (FIG. 4) which are directed towards the first and seocnd mirrors 36 and 37, respectively. In the example being illustrated, two walls of the reflector member 21 are confronted with the first and second mirrors 36 and 37. Three windows are opened in each wall of the reflector member 21 and are opposite to three windows of the other wall. Each window defines an inside wall surface contiguous to the internal reflection surface and an external surface of the reflector member 21. The ends of each laser medium 22 are inserted in a pair of the windows opposite to each other so that the first and second end surfaces 26 and 27 are exposed outside of the reflector member 21. As a result, the ends of each laser medium rest on the inside wall surfaces of the window pair and are supported thereon. Each laser medium 22 is fixed to the reflector member 21 by the use of a pair of spacers 53 which may be of quartz glass and inserted in side gaps left on both sides of each laser medium 22 in each window. Thus, a combination of the window and the spacer pair serves as a support member for supporting each of the first through third slab-shaped laser media $22_1$ to $22_3$.

The six elongated flash lamps 51 of each excitation member have longitudinal axes transverse or substantially perpendicular to the traveling direction of each laser beam and are laid with a spacing left between the flash lamps 51 and the adjacent laser medium or media, as described before.

Figure 10:
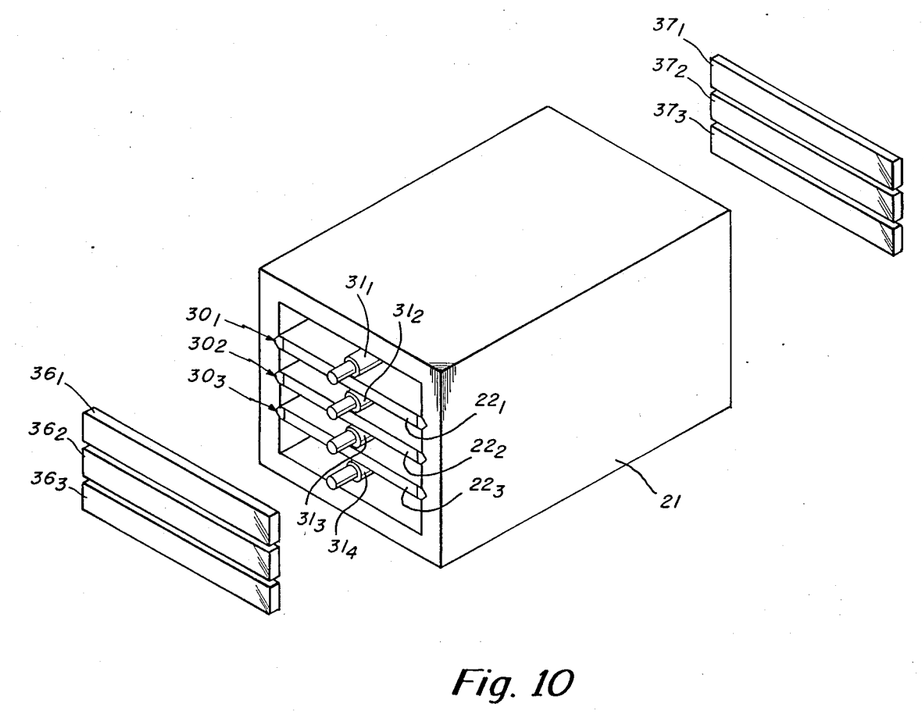
FIG. 10 is a schematic perspective view of a solid-state laser device according to a modification of the first embodiment illustrated in FIGS. 1 and 2.

Referring to FIG. 10, a solid-state laser device according to a modification of the first embodiment illustrated in FIG. 1 is similar to that illustrated in FIG. 1 except that each of the first and second mirrors 36 and 37 is divided into three panes depicted at $36_1$, $36_2$, and $36_3$; $37_1$, $37_2$, and $37_3$. Each pair of panes, such as $36_1$ and $37_1$; $36_2$ and $37_2$; $36_3$ and $37_3$, are confronted with the first and second end surfaces of each slab-shaped laser medium $22_1$, $22_2$, and $22_3$.

With this structure, each angle of the pane pairs can independently be adjusted relative to the laser beams.

Figure 11:
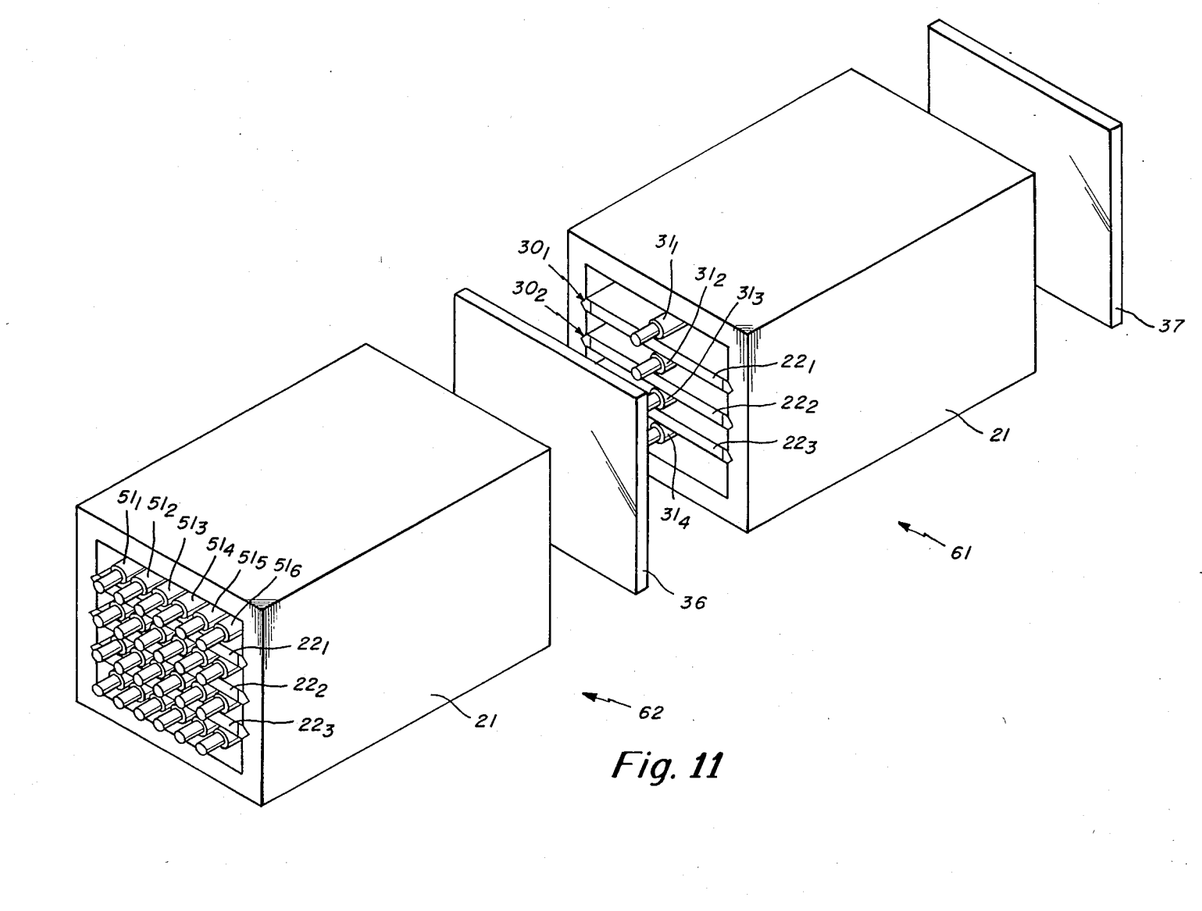
FIG. 11 is a schematic perspective view of a solid-state laser device according to a fifth embodiment of this invention.

Referring to FIG. 11, a solid-state laser device according to a fifth embodiment of this invention comprises a combination of an oscillation section 61 and an amplification section 62. The illustrated oscillation section 61 is substantially identical with the solid-state laser device illustrated in FIG. 1 while the amplification section 62 is similar to the solid-state laser device illustrated in FIG. 8 except that no resonator is coupled to the amplification section 62.

In FIG. 11, three laser beams are oscillated by the first through third slab-shaped laser media $22_1$ to $22_3$ of the oscillation section 61 and delivered through the first mirror 36 to the first through third slab-shaped laser media $22_1$ to $22_3$ of the amplification section 62 to be subjected to amplification therein. As a result, the amplification section 62 produces amplified laser beams.

From this fact, it is readily understood that each solid-state laser device illustrated in FIGS. 1, 6, 8, and 9 can be used as a laser amplifier.

As mentioned above, a plurality of laser beams are simultaneously emitted from the illustrated laser device and delivered to an object to be worked. This means that the object can be welded or perforated at a plurality of points at the same time. At any rate, the laser device can attain a high conversion efficiency of electric energy to optical energy. In other words, optical energy of the output laser beam can be augmented when electric energy is invariable.

In addition, the reflector member 21 may be simple in shape and small in size because the slab-shaped laser media may be supported in parallel.

While this invention has thus far been described in conjunction with several embodiments thereof, it will readily be possible for those skilled in the art to put this invention into practice in various other manners. For example, the numbers of the slab-shaped laser media and the excitation members may not be restricted to three and four, respectively. The number of the excitation members may be greater than that of the laser media by one. The cavity of the reflector member 21 may be elliptic, circular, or parabolic in cross section. In particular, when the additional gaps for the first and fourth excitation members, such as $31_1$ and $31_4$, have parabolic configurations having focal lines, the first and fourth excitation members may preferably be placed on the focal lines. In this event, the excitation light can effectively be converged to adjacent laser media, such as $22_1$ and $22_3$. The internal reflection surface may be formed by a combination of a plated layer of silver and an antioxidizing layer, such as $BaSO_4$. Each laser medium 22 may be, for example, of Nd:YAG, Nd:GGG, YLF, or the like.

What is claimed is:

1. A solid-state laser device, comprising:
    a reflector member having an internal reflection surface which defines an internal prismal space, and a pair of partial reflection surfaces opposite to each other;
    a plurality of slab-shaped laser media arranged from a first endmost laser medium to a second endmost laser medium in said internal prismal space, with at least one internal gap left between two adjacent ones of said plurality of slab-shaped laser media and with two additional gaps left between one of said partial reflection surfaces and said first endmost laser medium, and between the other of said partial reflection surfaces and said second endmost laser medium; and
    exciting members disposed in each of said at least one internal gap and in said two additional gaps for directly optically exciting said two adjacent ones of the slab-shaped laser media together with said first and said second endmost laser media.

2. A solid-state laser device as claimed in claim 1, wherein each of said slab-shaped laser media has a pair of principal surfaces opposite to each other and directed toward said partial reflection surfaces, a pair of end surfaces opposite to each other and contiguous to said principal surfaces, and a medium axis passing through said end surfaces, and each of said exciting members comprises a lamp member for producing excitation light to excite at least one of said slab-shaped laser media that is adjacent to said lamp member.

3. A solid-state laser device as claimed in claim 2, wherein said lamp member comprises:
    at least one elongated flash lamp that has an elongated lamp axis extended along said medium axis.

4. A solid-state laser device as claimed in claim 2, wherein said lamp member comprises:
    at least one elongated flash lamp that has an elongated lamp axis which is transverse to said medium axis and which is substantially parallel to said slab-shaped laser media.

5. A solid-state laser device as claimed in claim 2, wherein said lamp member comprises:
    a flash lamp of a flat type having a pair of lamp surfaces substantially parallel to each other.

6. A solid-state laser device as claimed in claim 5, wherein at least one of said lamp surfaces is kept substantially parallel to a confronting one of said principal surfaces.

7. A solid-state laser device as claimed in claim 5, wherein each of said lamp surfaces is coated with an electrically conductive layer.

* * * * *